United States Patent Office 3,682,854
Patented Aug. 8, 1972

3,682,854
SYNTHESIS AND DISPERSION OF RESIN PARTICLES IN A CONTINUOUS PHASE LOW MOLECULAR WEIGHT OXIDIZED POLYETHYLENE BINDER
Daniel Bennahmias, Oakland, Harry P. Locklin, Lafayette, and Paul Gordon Locklin, Walnut Creek, Calif., assignors to Hercules Incorporated, Wilmington, Del.
No Drawing. Continuation-in-part of application Ser. No. 744,673, July 15, 1968. This application Sept. 28, 1970, Ser. No. 76,241
Int. Cl. C08g 5/18, 17/14, 53/18
U.S. Cl. 260—29.1 R
11 Claims

ABSTRACT OF THE DISCLOSURE

Certain low molecular weight oxidized polyethylenes serve as the binder and preparative reaction medium for a resinous composition which is formed as a uniform particulate dispersion therein. Typical is the formation of particles of a co-condensate of melamine, formaldehyde, and toluene sulfonamide in combination with a dye to impart coloration to the particles. Colored particles may be formed so as to constitute 55% by weight and higher concentrations in the polyethylene. The colored concentrate is useful for incorporation into plastics for the coloration thereof.

---

This application is a continuation-in-part of application Ser. No. 744,673, filed July 15, 1968, now abandoned, for "Synthesis and Dispersion of Resin Particles in a Continuous Resin Binder Phase."

This invention relates to polyethylene compositions containing dispersed resin particles therein, and to the method of synthesis and distribution of the resin particles in the polyethylene.

In the plastics industry it is frequently desirable to incorporate colorants such as fluorescent pigments into plastic to cause a coloration of the plastic. To accomplish this, the selected pigment is added and mixed with plastic to be colored by various techniques. The usual procedures have had varying degrees of success. For example, during the incorporation of fluorescent colorants into plastic, problems have been encountered due to variations in color stability at extrusion and molding temperatures. Poor color development has occurred due to mixing shear limitations resulting in agglomerated pigment aggregates so that a good dispersion of the color through the plastic is not achieved. Production quality has been further complicated by pigment plate-out on extrusion and injection molding screws while pigment dusting has made housekeeping difficult.

The present invention provides a color concentrate which can readily be mixed into plastics to cause coloration thereof while avoiding problems of the foregoing type. More particularly, the present invention provides a concentrated meltable colorant of a suitable low molecular weight oxidized polyethylene containing 55% by weight and higher dispersed resin pigment particles. In the preferred embodiment these resin particles are fluorescent pigments so that the plastic to be colored with the concentrate will have a fluorescent appearance. An appropriate oxidized polyethylene with its unusually high concentration of colorants is compatible with polyolefins such as polyethylene and polypropylene and copolymers thereof over a wide density range. The color concentrates of this invention can also be used to color other plastics such as polystyrene and vinyls.

It is contemplated that the color concentrate will be added to the plastic to be colored by any of the usual methods such as incorporation during extrusion, injection molding and by hot melt incorporation. For example, the color concentrate and granules of resin to be extruded or molded can be handled in a normal manner such as by tumble drum mixing or proportioning with the color concentrate of this invention being pre-blended therewith.

Some of the advantages which flow from the use of the present colorants include excellent dispersion without agglomeration of the pigment, maximum possible color development, a minimum of shear required for most dispersion processes, minimal plate-out of colorant on metal processing dies, extrusion screws or calender rolls, easy clean-up of mixing equipment to facilitate color changes, and absence of dust. The resulting colored plastic has good physical properties, chemical resistance and thermal resistance in the amounts normally used, i.e. up to 10 parts of colorant per 100 parts of plastic to be colored. For example, the addition of the color concentrate of this invention to low density polyethylene has been shown to avoid stress cracking problems at low concentration and actually improve resistance to stress cracking when used in higher concentrations of 5–10% by weight.

The surprisingly high pigment concentration colorants of this invention provide a practical advantage by reducing the cost of shipping as compared with the cost of shipping a color concentrate having lower concentrations of pigment. The high concentration of pigment and relatively low amount of polyethylene binder also means that plastic colored therewith will contain relatively less of the polyethylene binder in obtaining a desired color intensity. Where a different kind of plastic is being colored (different than the polyethylene binder), it is generally desirable to avoid contamination with extraneous materials other than the pigment particles.

The polyethylene color concentrates of this invention are prepared by a special technique by which the resinous pigment particles are formed in situ from raw materials in a suitable low molecular weight oxidized polyethylene binder. Generally, this involves adding the pigment resin forming components to a compatible polyethylene of the indicated type and mixing the combination while subjecting it to pigment resin forming conditions. In the preferred embodiment, the pigment resin forming components are added substantially concurrently as individual raw materials and prior to any co-reaction. Also contemplated is the use of some pigment resin forming components which have been partially co-reacted prior to addition to the polyethylene with the balance of the unreacted raw materials needed to form the finished pigment resin being added therewith for in situ co-reaction in the low molecular weight polyethylene binder.

Successful use of the invention requires proper selection of the polyethylene binder which will receive the raw material reactants and allow formation of the resin in particulate form. The polyethylene selected must permit stirring after the raw material reactants are added at the temperature of the addition and throughout the course of the reaction by which the resin particles are formed. It has been found that certain low melting oxidized polyethylenes are suitable for this purpose, particularly in connection with the formation of resin particles formed from the co-condensation of an aryl sulfonamide such as toluene sulfonamide, formaldehyde, and an aminotriazine, such as melamine or benzoguanamine. Instead of an aryl sulfonamide, a hydantoin such as 5,5-dimethyl hydantoin may be used in the co-condensation. Thus, it has been found that certain polyethylenes of the indicated type can be stirred at the initial reaction temperatures of 80–90° C. where the methylol group is formed with the exemplified co-reactants and it remains stirrable at the reaction temperatures used thereafter. It has also been found that substantially uniformly sized discrete co-condensate resin particles are formed which are thoroughly distributed throughout the polyethylene binder. No separation occurs when a suitable binder is selected. In the absence of a binder in accordance with this invention separation is observed which may take the form of precipitation of the resin particles or other distribution inadequacies seen as non-uniformity of coloration of the binder. As noted, the particles can be formed to provide 55% by weight and higher concentrations (based upon the polyethylene binder weight above and excluding other additives such as stabilizers).

In general, these useful polyethylenes have a maximum viscosity equivalent to about 1200 cps. (Brookfield, 125° C., Spindle #3, 6 r.p.m.) and are oxidized. During formation of the pigment resin particles no substantial separation of the components present occurs. Useful polyethylenes are therefore herein referred to as "compatible." To select a useful "compatible" binder from oxidized polyethylenes with a viscosity as defined above for a particular application, a simple trial and error procedure is suggested.

Typical useful polyethylenes that have been found to date are the commercial materials known as Bakelite DYDT and Allied Chemicals' AC 629-11. A group of preferred materials for present purposes are the Eastman Epolenes designated E-10, E-11, E-12, E-13, E-14, E-15 and E-45 which are designed for hot melt and solution applications. Particularly good results have been obtained with Epolene E-14 which is described by the manufacturer as having the following physical properties:

Ring and ball softening point, ° C. _____ 104
Penetration hardness, 100b/5 sec./25° C., tenths of mm. _____ 4
Density, 25° C. _____ 0.939
Acid number _____ 16
Color, Gardner scale _____ 2
Molecular weight, approximate _____ 1,800
Brookfield viscosity, cps., 125° C., Spindle #3, 6 r.p.m. _____ 320

Another preferred material for use as a binder in this invention is BASF OA polyethylene wax which is a low molecular weight polyethylene having the following specifications:

Color: Practically white
Point of fusion: 93-96° C.
Point of solidification: 92° C.
Density at 20° C.: .96
Acid number: 25-35
Saponification number: 45-55
Molecular weight: Approximately 1200

Using a compatible polyethylene of the above type as the reaction medium, the pigment particles can be formed from any of the typical components well known in the art for this purpose under the usual reaction conditions previously used. A preferred group of resins is the aminotriazine-formaldehyde condensation resins which may be co-condensed with an aryl sulfonamide. Typical of this group is the co-condensate formed with melamine, toluene sulfonamide and formaldehyde. In a common application of the invention the resin will be formed in combination with a dye to impart color. Such dyes may be added as part of the raw materials to the polyethylene binder. The resin formed will in general selectively sequester the dye and incorporate it into its particle structure. In the preferred embodiment daylight fluorescent dyes are utilized with the formation of daylight fluorescent colored resins as a dispersed phase in the continuous phase polyethylene binder. Instead of or in addition to dyes other additives such as ultraviolet inhibitors and stabilizers may be added as part of the raw materials for inclusion in the finished resin particles.

In general, the process is carried out by heating the polyethylene binder to a sufficiently liquefied state so that it can be adequately mixed and agitated. The selected resin forming raw materials and colorant are added to the binder and mixed with continued heat. All the elements are uniformly dispersed and the mixture is brought to a molten stage. As the procedure continues, polymerization of the resin forming components occurs. The resin cures in a dispersed condition. The specific times and temperatures required and the extent of mixing will depend upon the particular materials involved and the concentrations thereof. As noted, particle concentrations of 55% by weight and preferably above about 65% by weight can be obtained.

The examples to follow will illustrate the process in the preparation of a color concentrate which may be used by incorporation into other plastics as a colorant.

EXAMPLE I 150 grams of Union Carbide's Polyethylene DYDT is placed in a quart can and mixed (Delta mixer) using a propeller type mixing blade. The can is heated with a heating mantle and mixed at a medium speed during the entire synthesis. The polyethylene is heated to 115° C. At 115° C., 197.5 grams toluene sulfonamide (Santicizer 9-P), 56.7 grams paraformaldehyde, 58.5 grams melamine, 10 grams $H_2O$, 1.73 grams Rhodamine BXP, .86 gram Rhodamine 6GDN and 5.25 grams 6G Base are added over a period of about two minutes. Heating and mixing are continued to bring the temperature up to 160° C. When the temperature reaches 160° C., heat is removed, mixing is stopped and the mixture is poured into a suitable container for cooling. When cool, the resulting product may be ground in a plastic grinder and then used as an excellent fluorescent orange-red colorant for plastics.

EXAMPLE II

Example I was repeated with the exception of the use of 200 grams of Eastman Kodak's Epolene E-14 polyethylene instead of the DYDT polyethylene. A superior color concentrate was obtained.

EXAMPLE III

Example I was repeated with the exception of the use of 200 grams of BASF's OA polyethylene wax having the specifications previously given. A superior color concentrate was obtained.

EXAMPLE IV

A pink fluorescent color concentrate was made from the following:

| Material: | Amount (grams) |
|---|---|
| Epolene E-14 | 200 |
| 5,5-dimethylhydantoin | 153 |
| Benzoguanamine | 114 |
| Paraformaldehyde | 14 |
| Formalin (37%) | 100 |
| Rhodamine BXP | 1.65 |
| Rhodamine B Base | 2.4 |
| Rhodamine 6 GDN | 2.55 |
| $TiO_2$ | 18.0 |
| Stabilizers: | |
| Irganox 1010 | 21.0 |
| Mark-C | 21.0 |

In a heated container and using a Teknor mixer the Epolene E-14 polyethylene was mixed and brought to 120° C. The benzoguanamine and paraformaldehyde were added. After two minutes and with the temperature at 100° C., the Formalin was added. After six minutes and with the temperature at 95° C., the rhodamine dyes were added. At the end of seven minutes and with the temperature at 101° C., the $TiO_2$ was added. At eight minutes and with a temperature of 100° C., a vigorous reaction was observed. At the end of 26 minutes and with the temperature of 100° C., a vigorous reaction was observed. At the end of 26 minutes and with the temperature at 165° C., the Irganox and Mark-C were added. Stirring was continued for an additional ten minutes. The desired concentrate is then obtained which can be cooled, ground or used as desired.

EXAMPLE V

An orange-red fluorescent color concentrate was made from the following:

| Material: | Amount (grams) |
|---|---|
| Epolene E-10 | 200 |
| p-Toluene sulfonamide | 198 |
| Melamine | 59 |
| Paraformaldehyde | 89 |
| Formalin (37%) | 103 |
| Rhodamine BXP | 2.0 |
| Rhodamine 6 GDN | 4.33 |
| Rhodamine G Base | 10.0 |
| Stabilizers: | |
| Irganox 1010 | 21.0 |
| Mark-C | 21.0 |

In a heated container and using a Teknor mixer the Epolene E-10 polyethylene was mixed and brought to 120° C. The p-toluene sulfonamide and melamine were added. After two minutes and with the temperature at 100° C., the paraformaldehyde was added. After two and one-half minutes and with the temperature at 100° C., the formalin was added. At the end of 12 minutes and with the temperature at 100° C., the rhodamine dyes were added. At the end of 22 minutes and with the temperature at 155° C., the Irganox and Mark-C were added. Stirring Stirring was continued for an additional ten minutes. The desired concentrate is then obtained which can be cooled, ground or used as desired.

The polyethylene Epolene E-10 used in this example has the following specifications:

| | |
|---|---|
| Ring and ball softening point, ° C. | 106 |
| Penetration hardness, 100b/5 sec./25° C., tenths of mm. | 3 |
| Density, 25° C. | 0.942 |
| Acid number | 15 |
| Color, Gardner scale | 2 |
| Molecular weight, approximate | 3,000 |
| Brookfield viscosity, cps., 125° C., Spindle #3, 6 r.p.m. | 200 |

In the claims:

1. A process for the formation of a dispersed phase resin in a continuous phase binder comprising: providing a compatible low molecular weight oxidized polyethylene, adding thereto resin forming components as individual raw materials and prior to co-reaction therebetween, said individual raw materials including an aryl sulfonamide, formaldehyde, and an aminotriazine and being added to the binder substantially concurrently, mixing said binder to uniformly disperse said resin forming components while subjecting the mixture to reaction conditions to form uniformly dispersed resin particles throughout said binder.

2. A process in accordance with claim 1 wherein said raw materials comprise toluene sulfonamide, formaldehyde and melamine and including a fluorescent dye for incorporation in said dispersed resin particles.

3. A process in accordance with claim 1 wherein said raw materials comprise dimethylhydantoin, formaldehyde, and benzoguanamine and including a fluorescent dye for incorporation in said dispersed resin particles.

4. In the process for making a color concentrate having pigment particles dispersed in a resinous carrier, the improvement comprising; reacting with mixing pigment resin forming components comprising an aryl sulfonamide, formaldehyde, and an aminotriazine in a compatible low molecular weight oxidized polyethylene having a maximum viscosity (Brookfield, cps., 125° C., Spindle #3, 6 r.p.m.) of about 1200 to form pigment particles uniformly dispersed in said polyethylene.

5. The process in accordance with claim 4 wherein said pigment resin forming components consist essentially of melamine, toluene sulfonamide, formaldehyde, and at least one fluorescent dye.

6. In the process for making a color concentrate having pigment particles dispersed in a resinous carrier, the improvement comprising: reacting with mixing pigment resin forming components consisting essentially of dimethylhydantoin, formaldehyde, benzoguanamine and at least one fluorescent dye in a compatible low molecular weight oxidized polyethylene having a maximum viscosity (Brookfield, cps., 125° C., Spindle #3, 6 r.p.m.) of about 1200 to form pigment particles uniformly dispersed in said polyethylene.

7. A concentrate for incorporation into plastic for the coloration thereof comprising: low molecular weight oxidized polyethylene containing at least about 55% by weight of colored fluorescent pigment particles uniformly dispersed therein, said concentrate being substantially water-free.

8. A concentrate in accordance with claim 7 wherein said pigment particles are a co-condensation of an aryl sulfonamide, formaldehyde, and an aminotriazine.

9. A concentrate in accordance with claim 7 wherein said polyethylene contains above 65% by weight of colored pigment particles.

10. A concentrate for incorporation into plastic for the coloration thereof comprising: low molecular weight oxidized polyethylene having a maximum viscosity (Brookfield, cps., 125° C., spindle #3, 6 r.p.m.) of about 1200 and sufficient fluorescent pigment particles uniformly dispersed therein to impart coloration thereto.

11. A concentrate in accordance with claim 10 wherein said polyethylene has the following physical properties:

| | |
|---|---|
| Ring and ball softening point, ° C. | 104 |
| Penetration hardness, 100b/5 sec./25° C., tenths of mm. | 4 |
| Density, 25° C. | 0.939 |
| Acid number | 16 |
| Color, Gardner scale | 2 |
| Molecular weight, approximate | 1,800 |
| Brookfield viscosity, cps., 125° C., Spindle #3, 6 r.p.m. | 320 |

References Cited
UNITED STATES PATENTS

| | | | |
|---|---|---|---|
| 3,455,856 | 7/1969 | Voedisch et al. | 260—21 |
| 3,379,664 | 4/1968 | Wiley | 260—28.5 |
| 3,412,034 | 11/1968 | McIntosh et al. | 252—301.2 |
| 3,095,388 | 6/1963 | Osmond et al. | 260—31.8 |
| 3,330,684 | 7/1967 | Wheeler | 260—28.5 |
| 3,362,839 | 1/1968 | Weindel | 260—28.5 |
| 3,532,662 | 10/1970 | Ansdell | 260—29.1 |

DONALD E. CZAJA, Primary Examiner

R. W. GRIFFIN, Assistant Examiner

U.S. Cl. X.R.

8—DIG. 7; 117—33.5 R, 161 LN, 168; 260—28, 41 C, 854, 856, DIG. 34